United States Patent [19]

Parra

[11] Patent Number: 5,251,187
[45] Date of Patent: Oct. 5, 1993

[54] METHOD AND APPARATUS FOR SEPARATING DOLPHIN FROM TUNA AND STEERING DOLPHIN TO A SAFE AREA

[76] Inventor: Jorge M. Parra, 7332 Grand Blvd., New Port Richey, Fla. 34652

[21] Appl. No.: 736,324

[22] Filed: Jul. 26, 1991

Related U.S. Application Data

[62] Division of Ser. No. 672,228, Mar. 20, 1991, Pat. No. 5,117,572.

[51] Int. Cl.$^5$ .......................... H04B 1/02; H04B 1/03
[52] U.S. Cl. .................................... 367/139; 367/137
[58] Field of Search .................. 367/139, 131, 133, 3, 367/4, 5, 6, 191, 137; 43/17.1

[56] References Cited

U.S. PATENT DOCUMENTS

| | | | |
|---|---|---|---|
| 3,524,276 | 8/1970 | Thomas et al. | 367/139 |
| 3,717,844 | 2/1973 | Barret et al. | 367/6 |
| 3,800,271 | 3/1974 | Stillman, Jr. | 367/4 |
| 3,849,927 | 11/1974 | Gonsalves | 43/17.1 |
| 3,885,338 | 5/1975 | York | 43/17.1 |
| 3,939,465 | 2/1976 | Helton et al. | 367/133 |
| 4,193,219 | 3/1980 | Pogue | 43/14 |
| 4,312,054 | 1/1982 | Holand | 367/142 |

OTHER PUBLICATIONS

"Porpoises Saved from Tuna Seine by Underwater Sounds," Commercial Fisheries Review, vol. 33, #10, pp. 23-24, Oct. 1971.

*Primary Examiner*—Ian J. Lobo
*Attorney, Agent, or Firm*—Jim Zegeer

[57] ABSTRACT

Improvements on the Parra "METHOD AND APPARATUS FOR SEPARATING DOLPHIN FROM TUNA" using the primordial fear of dolphin of killer whales to separate dolphin from tuna wherein the sound of feeding killer whale is recorded, digitized, edited and enhanced to produce digitally synthesized killer whale sounds. These digitally synthesized sounds of one or more feeding killer whale is played under water and in the vicinity of a mixed school of dolphin and tuna and as the dolphin leave said vicinity, catching the tuna in nets. According to the present invention, one or more of a plurality of playback units are selectively triggered on and off from a remote location to steer the dolphin to safety. The playback unit is carried in an elongated hollow tube having a weighted end and a recovery end, the weight causing the end it is on to go to a predetermined depth in the sea with the recovery end having a hook for aerial retrieval. In one embodiment, the playback unit is in the form of a killer whale sonic grenade and a pressure sensor senses a predetermined depth and activates the playback unit.

11 Claims, 3 Drawing Sheets

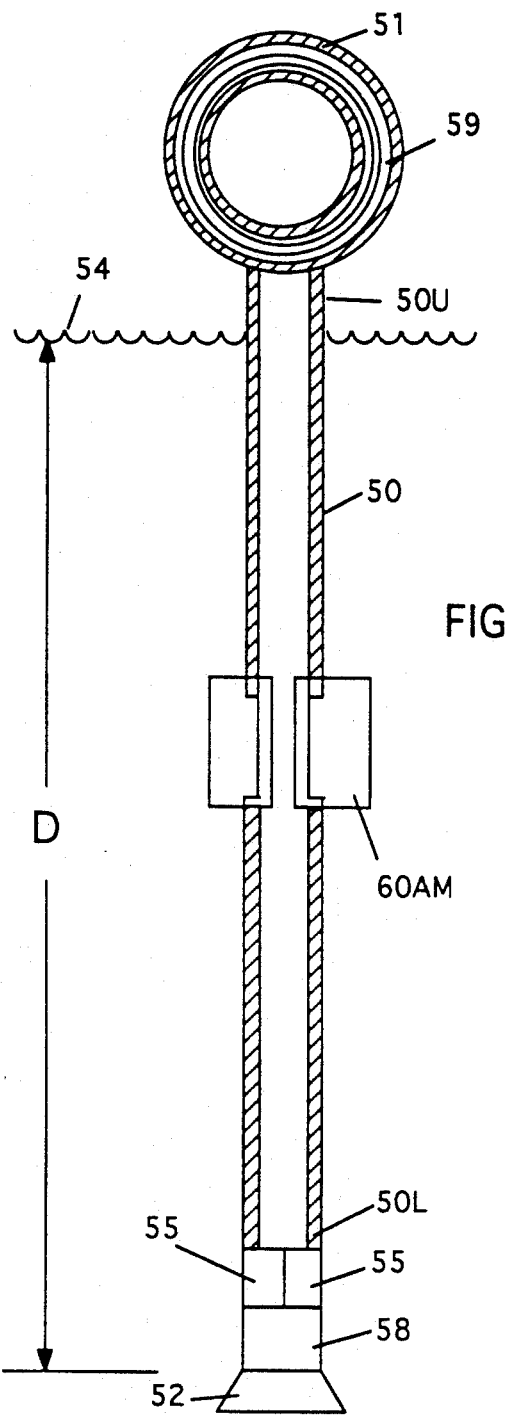
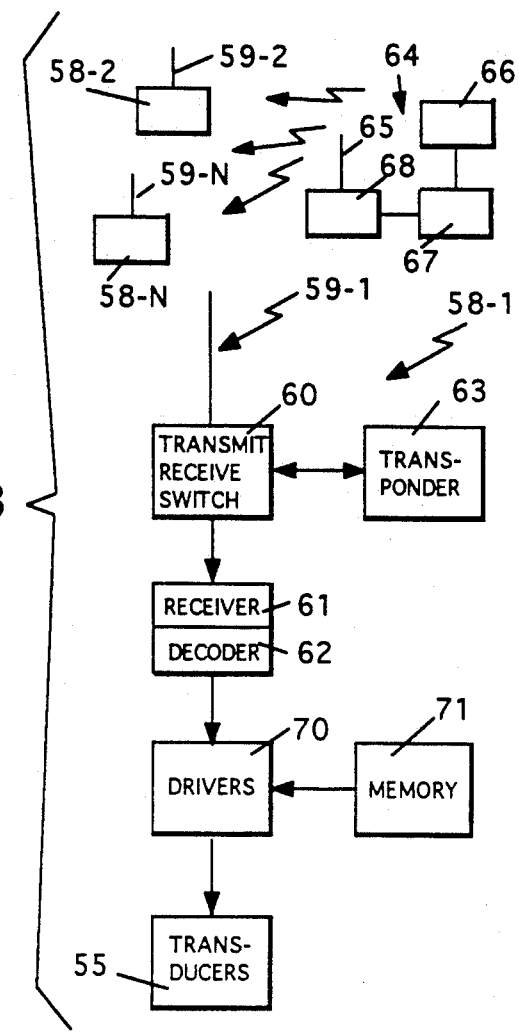
FIG.2
FIG.3

METHOD AND APPARATUS FOR SEPARATING DOLPHIN FROM TUNA AND STEERING DOLPHIN TO A SAFE AREA

This is a divisional of application Ser. No. 07/672,228 filed Mar. 20, 1991 now U.S. Pat. No. 5,117,572.

The present invention relates to a method and apparatus for separating certain aquatic mammals, such as dolphins, from food fish such as tuna and the like and is an improvement on the invention disclosed in Parra application U.S. Ser. No. 07/633,539, filed Dec. 28, 1990, now patented owned by the assignee hereof.

BACKGROUND AND BRIEF DESCRIPTION OF THE INVENTION

Dolphin use a form of sonar to locate food fish, such as mullet, and, it is believed, that tuna travel with dolphin because the tuna does not have sonar ability. In the past, there have been several techniques utilized by commercial tuna fishermen to separate dolphin from tuna. In one technique, tuna fishermen in small boats in advance of the nets have attempted to chase the dolphin away from the nets and this technique has resulted in the injury and possible loss of life to tuna fishermen and still results in some dolphin being caught in tuna nets. Others have attempted explosions in the water to frighten the dolphin but this can be harmful to dolphin in that it can cause deafness.

Dolphin, when properly stimulated, can swim much faster than tuna. The locomotion of dolphins is typical of the whale. The main thrust comes from vertical oscillations of the tail flukes, and most species are capable of sustained swimming speeds of up to 30 km/h (18.6 mph). In shorter bursts, dolphins can attain a speed of 37 to 40 km/h (23 to 25 mph), and in a few instances a speed of 48 km/h (30 mph) has been reported. Shipboard observers commonly see dolphins swimming in the bow wave of a moving vessel. The animals actually ride the bow wave by using the thrust of the ship—they seem to rest motionless as they are carried along. Tuna, on the other hand are a school fish and travel much more slowly. Even when agitated, they generally stay within the school envelope which moves rather slowly. The Parra invention utilizes this fact and the primordial or hereditary fear by dolphin of the killer whale to physically separate dolphin from tuna. This permits the tuna to be caught in tuna nets without the dolphin being captured in the tuna net. According to the invention disclosed in the above-identified Parra application, the sound of one or more killer whale feeding is captured by a transducer, converted to digital signals and then edited to edit out splashing sounds or other non-useful portions of the recording. In addition, the killer whale feeding sounds are enhanced by producing more of them. Thus, the killer whale's feeding frenzy sounds are recorded, digitized, edited and enhanced and then broadcast in the sea water by a high power acoustic transducer to simulate the killer whale feeding sounds.

The dolphin, upon hearing the sound rapidly swim away from the source. The tuna, which do not have the "memory factor" of the dolphin, may try to keep up but, because they have a blimpish body and are a "school fish", while individual tuna may be fast, as a school they are slower (flank speed of a tuna school is about 3.33 km/h (2 mph) than the dolphin stimulated by the feeding killer whale sounds and are quickly isolated or separated so the tuna may be caught in nets without harm to the dolphin. In the preferred embodiment, these enhanced feeding sounds of killer whales are digitally stored and selectively reproduced in one or several of a plurality of selectively dispersed underwater transducers. In one embodiment, the transducers are dispersed by small boats or a helicopter or other aircraft in a predetermined pattern and in an area between or behind the fishing nets relative to a mixed school of tuna and dolphin. Each transducer is selectively controlled by a radio signal and the movement of the dolphin observed. Should the dolphin head in a direction which would lead them to danger of the nets, a transducer in that area is activated to generate the killer whale feeding sound and thereby steer the dolphin toward a safe area. In one embodiment, the transducers have floats and an associated recovery transponder loop or hook so that they may be easily retrieved.

DETAILED DESCRIPTION OF THE DRAWINGS

Figure 1:
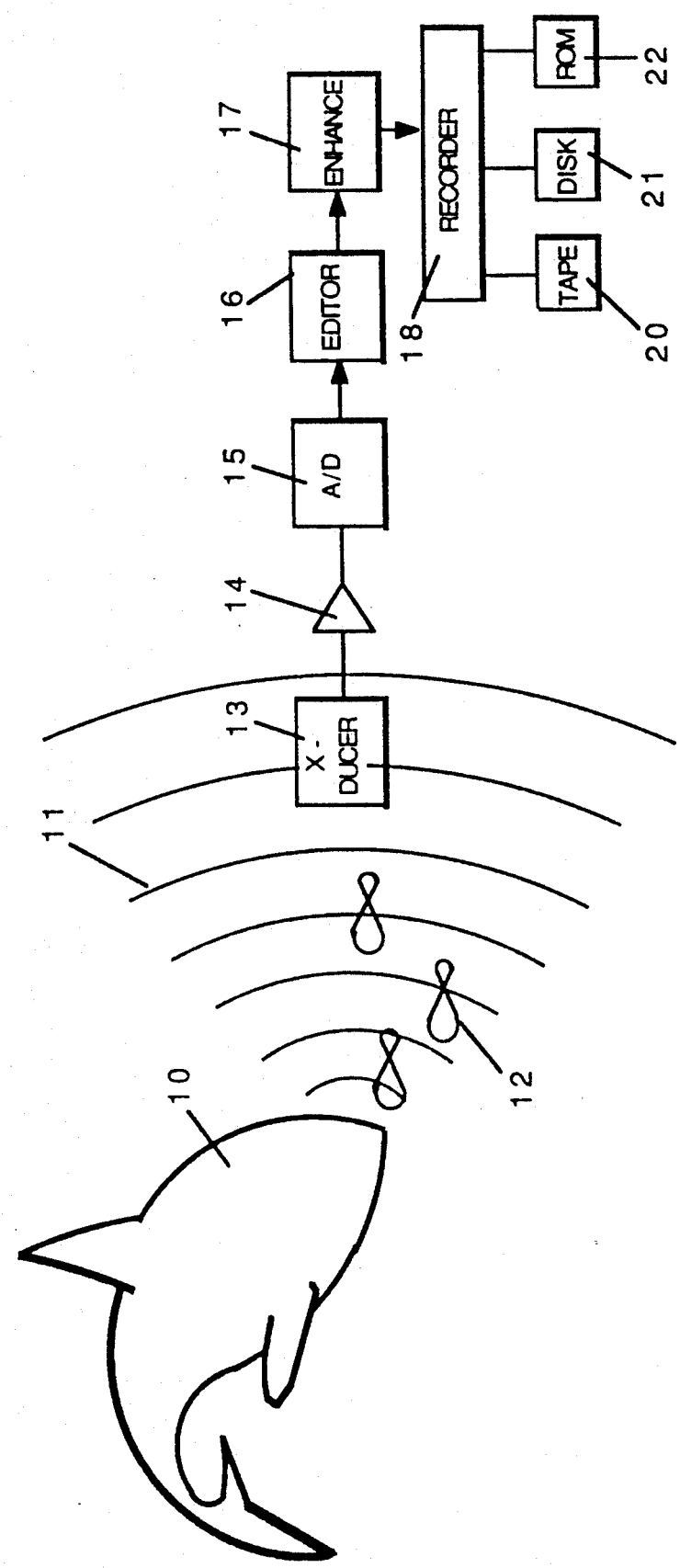
Figure 4:
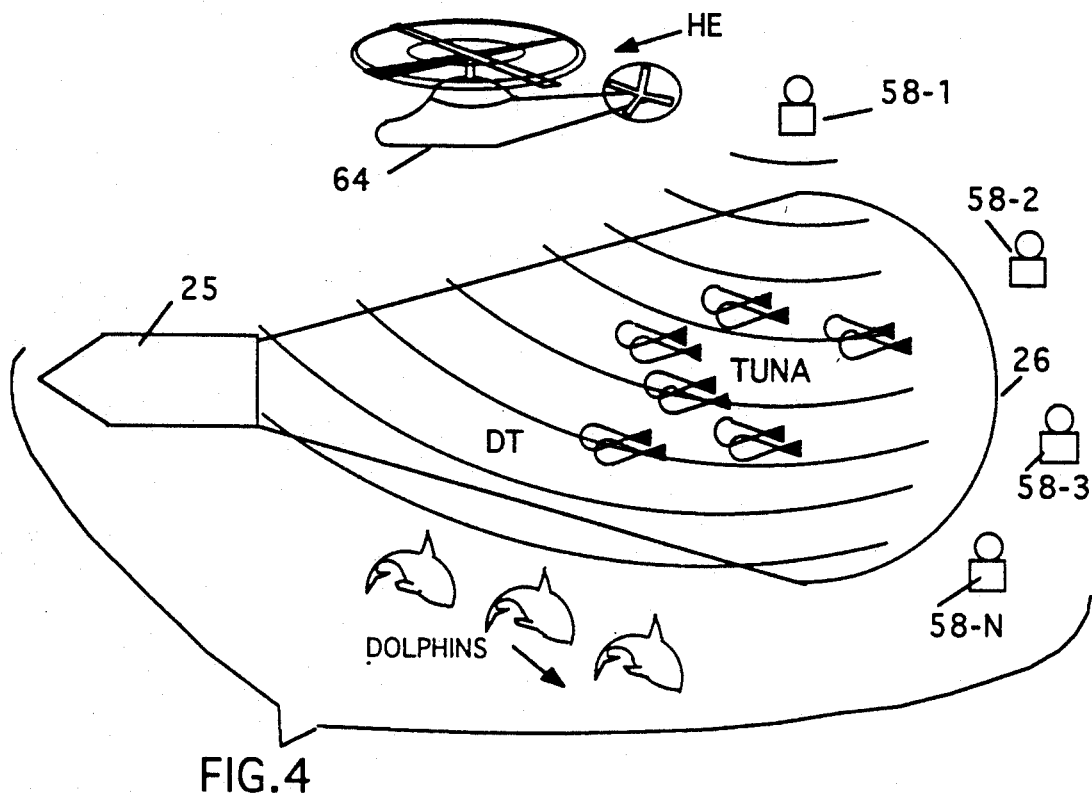
Figure 5A:
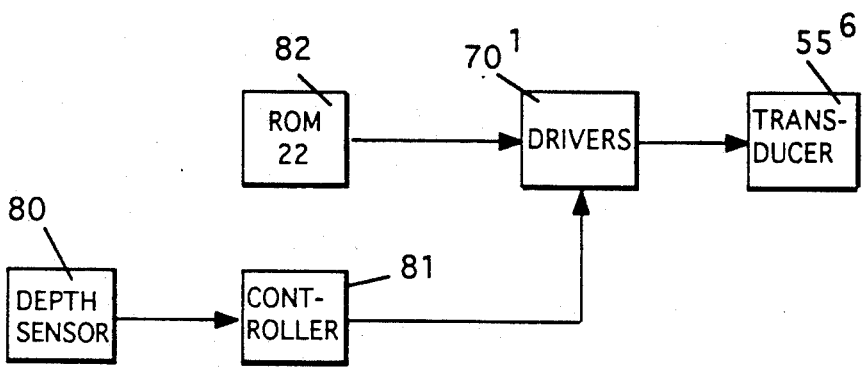
Figure 5B:
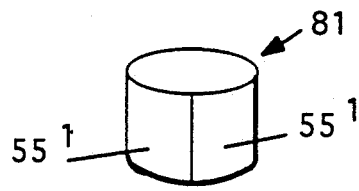

The above and other objects, advantages and features of the invention will become more apparent when considered with the following specification and accompanying drawings wherein:

FIG. 1 is a block diagram illustrating the Parra method of capturing of the killer whale sounds; digitization, editing and enhancement and recording thereof, FIG. 2 illustrates afloatable recoverable remote controlled transducer, FIG. 3 is a block diagram of the circuit carried by the remote controlled recoverable transducer, FIG. 4 illustrates positioning of the transducers for converting the digitally recorded killer whale feeding sounds to acoustic energy for coupling into the salt water between the ship and the tuna nets and steer the dolphin away from the tuna nets toward a safe area, and FIG. 5a illustrates the block diagram of a low cost disposable depth actuated transducer, and FIG. 5b illustrates a killer whale sound grenade or cannister for carrying the pressure activated circuit.

DETAILED DESCRIPTION OF THE INVENTION

As disclosed in the above-identified Parra application, it is known that aquatic mammals living in the sea have over the millennium developed a primordial fear of predator aquatic animals and that fish, such as tuna, have no memory and thus have not developed the same primordial fear that aquatic animals such as dolphin, sea lions, whales and sea otters, for example, have developed. Thus, while tuna may have a certain immediate fear of being eaten by a killer whale, for example, it is not nearly as strong as those senses have developed in the dolphin. Other sea mammals such as sea lions, seals, otters, and the like have similarly developed primordial fears of the feeding sound of killer whales, or other sea predators which are capable of generating sounds that generate the primordial fear in this higher order of aquatic animals. The above-referenced Parra invention synthesizes the feeding sounds of predator aquatic animals such as the killer whale and uses the synthesized sound and the differential in speed to separate tuna from dolphin.

Referring to FIG. 1, a feeding killer whale 10 is generating killer whale feeding sounds which are indicated by pressure waves 11 launched in the sea as the killer whale 10 is feeding on fish 12. These pressure or soundwaves 11 are picked-up by hydrophone or transducer 13 which is a broadband transducer picking-up both infrasonic sounds as well as high frequency sounds over a wide spectrum and the soundwaves 11 are converted to electrical signals by transducer 13, amplified by amplifier 14 and converted to a digital signal by analog-to-digital converter 15. This provides a digital rendition of the killer whale feeding sounds which is edited in editor 16 to delete splashing sounds, and other non-useful portions of the digitized audio signal.

The edited digital signals of the killer whale feeding sounds are then enhanced in enhancing module 17. Enhancement may take the form of making the sounds more forceful by repeating them at a higher rate (while maintaining the same sound frequency spectrum). During this phase of the process of producing the synthesized killer whale feeding sounds, testing may be done by playing the sounds in pools where captured dolphin are located, and by modifying the repetition rate as well as the energy levels it is possible to make the killer whale feeding sounds more forceful and thus have more of an effect on the dolphin in inducing the primordial fear in the dolphin of the killer whale. After the digital signals of the killer whale feeding sounds have been enhanced in enhancer 17, a record thereof is made in recorder 18 such as on a tape 20, a disk 21 (magnetic or optical) or in an electronic chip read only memory 22 such as a LSI ROM memory.

Referring to FIG. 2, a floatable recoverable remote controlled transducer assembly includes a hollow pipe or tube 50 sealingly joined to its upper end 50U to a hollow recovery loop or hook 51. The lower end 50L of pipe 50 has a weight member 52, which may include batteries for driving the electronic circuit shown in FIG. 3. Thus, while the pipe 50 and loop 51 are hollow and float the lower end of the pipe is weighted so as to cause the lower end to be positioned by gravity effects below the water surface 54 a predetermined distance D. The length of pipe 50 can be adjusted by conventional adjustment medium 60 AM to adjust the depth below water of the transducer. Instead of a hollow pipe, the transducer can be weighted and tethered by a flexible cable to a float carrying the antenna. One or more transducers 55 are mounted on the external surface of the lower end 50L of pipe 50.

The electronic circuit 58 shown in FIG. 3 may be located in the lower end 50L of hollow pipe 50 near the batteries 52 or in the upper end near the antenna 59 or even in the middle of tube 50. A shielded cable (not shown) in the interior of pipe 50 are used to interconnect the electronic components and the antenna 59.

Referring to FIG. 3, a plurality of recoverable remote control transducer assemblies 58-1, 58-2, 58-3 . . . 58-N, are assigned unique code numbers and are dispersed in a predetermined pattern such as shown in FIG. 4. The block diagram for remote controlled transducer 58-1 is exemplary of all the transducers, and as shown in FIG. 3, antenna 59-1 is connected by transmit-receive switch 60 to receiver 61 or transponder 63.

Transmitter 64 may be on a ship, or, preferably is carried on an aircraft such as a helicopter HE where the operator can have a good view of the area. Transmitter 64 includes antenna 65, a code selector 66 and a coding unit 67 for generating the selected code for a particular remote controlled transducer assembly 58-1 or 58-2 . . . or 58-N. Transmitter 64 has a power section 68 which generates and amplifies an RF carrier upon which the selected transducer code is modulated and transmitted or radiated into space by antenna 65 to be received by each of the remote controlled transducer assemblies 58-1, 58-2, 58-3 . . . 58-N. Decoders 62 in each of the assemblies are set to detect or decode the unique code words allocated to them and upon detection of an assigned code word activating transducer driver 70, which receive the stored killer whale feeding sounds from a memory 71, which can be one of the memory devices 20, 21 or 22. In this embodiment, a solid-state memory is preferred. The transducers 55 are high power (200-400 watts) and are driven by electrical signals from driver 70 to reproduce and launch in the water the edited and enhanced killer whale feeding sounds. The operator, observing from a helicopter HE, for example, watches the direction the dolphins move and should they appear to be heading from an area where they might get trapped in a tuna net, the remote transducer in that area is activated by radio control from transmitter 64. Instead of radio waves, it will be appreciated that sonic transmitter operating at frequencies outside the killer whale feeding frequencies, or optical signalling systems may be used. The transducers may be driven separately, selectively or simultaneously depending on the direction they are oriented relative to the dolphin and the direction the dolphin are to be steered to.

Referring now to FIG. 4, a tuna ship 25 tows one or more nets 26 and may have a number of smaller ships or boats (not shown) which tend tuna nets 26. The nets may be of any type including drag, purse seine, roller, etc. A helicopter HE has noted the relative positions of the tuna ship 25, its nets 26, and the mixed school of dolphin and tuna DT. In this illustration, the helicopter has dispersed a plurality of remotely controlled transducers 58-1, 58-2, 58-3 . . . 58-N to define a line opposite to the mixed school DT so that when activated any one or several or all of the units 58-1, 58-2, 58-3 . . . 58-N can emit the killer whale feeding sound will drive the dolphin at high speed in a direction opposite the line and away from the nets and the tuna. One or more transducers 58 are connected to a playback driver 70 and have one of the records 20, 21, 22 in memory 71 for driving the transducers 55. Transducer 55, may be omni-directional or directional, and the playback driver units 70 may be selectively triggered on and off by a radio signal from a transmitter 29 on the helicopter HE and received by a receiver 61. If the proper coded signal is received, receiver 61 triggers the playback driver 70 "on" and/or "off" to selectively playback the recorded killer whale sounds which are amplified and applied to transducer 55 to thereby broadcast into the sea water the killer whale feeding sounds.

This causes the dolphin 31, which may be swimming with a school of tuna DT or slightly above the tuna, to separate quickly from the tuna because of its significantly greater speed and thereby permit the tuna to be captured in the nets 29 free or substantially all dolphin.

Instead of radio controls, the playback unit may be in the form of low cost disposable killer whale sound grenades which are pressure activated. In FIG. 5, a depth sensor or pressure detector 80 senses when the sound grenade 81 is at a predetermined depth below the surface of the sea and activates controller 81, which, in turn, activates ROM 82 to supply edited and enhanced killer whale signals to driver 70' and one or more transducers 55'. The depth sensors can be set to be activated at different predetermined depths, and can be designed to have a predetermined overall buoyancy so they will substantially stabilize at a given depth.

While there has been shown and described a preferred embodiment of the invention, it will be appreciated that other embodiments will be readily apparent to those skilled in the art and it is desired to encompass such obvious modification and variations within the spirit and scope of the claims appended hereto.

What is claimed is:

1. An apparatus for separating dolphin from tuna, comprising, digital record means having stored therein a digitally synthesized feeding frenzy sounds of one or more killer whale(s), means for editing said digitally synthesized feeding frenzy sounds of one or more killer whale(s) to remove splash and other non-useful sounds to produce edited digitally synthesized feeding frenzy sounds of one or more killer whale(s), playback means for playing said edited digitally synthesized feeding frenzy sounds of one or more killer whale(s), a transducer means immersible in the water and connected to said playback means for broadcasting said digitally edited synthesized feeding frenzy sounds of one or more killer whale(s) in the water, means for selectively turning said playback means "on" including, coding means for producing and broadcasting a unique code signal for said transducer means, and means connected to said transducer for decoding said unique code and selectively activating said transducer means to broadcast said edited digitally synthesized feeding frenzy sounds of one or more killer whale(s) in the water.

2. Apparatus as defined in claim 1 including means for enhancing the edited digitally synthesized feeding frenzy sounds of one or more killer whale(s).

3. Apparatus as defined in claim 2 said enhancement includes repeating said sounds at a higher rate while maintaining the same sound frequency spectrum.

4. Apparatus as defined in claim 1 including retrieving means secured to said apparatus.

5. Apparatus as defined in claim 1 including a hollow tubular member, weight means at one end of said hollow member, and means mounting said transducer on said one end.

6. Apparatus as defined in claim 5 wherein said hollow member is an elongated tube.

7. Apparatus as defined in claim 5 wherein said hollow member is an elongated tube and said weight means includes electrical storage batteries.

8. Apparatus as defined in claim 5 wherein said hollow member is an elongated tube and including means for adjusting the length of said tube to adjust the depth said transducer is immersed in the water.

9. An underwater sound grenade for separating sea mammals from tuna, comprising, read-only memory (ROM) means for digitally recording an edited and enhanced digitally synthesized feeding frenzy sound of one or more feeding killer whale(s), playback means connected to said ROM means for playing said digitally synthesized feeding frenzy sound of one or more killer whale(s), an underwater transducer connected to said playback means for broadcasting said digitally synthesized feeding frenzy sound of one or more killer whale(s) in the water, and depth sensor means for activating said playback means a predetermined depth below the surface of water.

10. A water flotable recoverable remote control transducer assembly comprising:
 a hollow tube having an upper and a lower end, a recovery hook sealingly joined to the upper end of said hollow tube and a weight means carried in said lower end so that said lower end is positioned by gravity effects below the water a predetermined distance,
 at least one transducer mounted on said lower end of said hollow tube, an electronic circuit for driving said one or more transducers with digitally synthesized feeding frenzy killer whale sounds, and
 means for remotely controlling said electronic circuit.

11. The invention defined in claim 10 including means for adjusting the length of said hollow tube.

* * * * *